United States Patent
Lu et al.

(10) Patent No.: US 8,620,151 B2
(45) Date of Patent: Dec. 31, 2013

(54) PHOTOGRAPHIC AND PROJECTION MODULE AND ELECTRONIC SYSTEM HAVING THE SAME

(75) Inventors: Tsung-Yi Lu, Taipei (TW); Chao-Han Pao, Taipei (TW); Hsiang-Ho Chou, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 0 days.

(21) Appl. No.: 13/465,786

(22) Filed: May 7, 2012

(65) Prior Publication Data

US 2012/0218644 A1 Aug. 30, 2012

Related U.S. Application Data

(63) Continuation-in-part of application No. 12/723,053, filed on Mar. 12, 2010, now abandoned, and a continuation-in-part of application No. 13/347,470, filed on Jan. 10, 2012.

(51) Int. Cl.
*G03B 21/00* (2006.01)

(52) U.S. Cl.
USPC .......................................... 396/430; 352/138

(58) Field of Classification Search
USPC ............................ 396/430; 353/31; 352/138
See application file for complete search history.

(56) References Cited

U.S. PATENT DOCUMENTS

| | | | |
|---|---|---|---|
| 4,704,022 A | 11/1987 | Nozawa et al. | |
| 5,258,844 A | 11/1993 | Nakayama et al. | |
| 5,528,297 A | 6/1996 | Seegert et al. | |
| 5,537,168 A | 7/1996 | Kitagishi et al. | |
| 6,651,363 B1 * | 11/2003 | Johnson | 40/361 |
| 6,867,821 B2 | 3/2005 | De Schipper | |
| 6,992,718 B1 | 1/2006 | Takahara | |
| 7,465,107 B2 * | 12/2008 | Washisu et al. | 396/351 |
| 7,500,758 B1 | 3/2009 | Adachi et al. | |
| 7,782,549 B2 | 8/2010 | Hashi et al. | |
| 7,891,826 B2 | 2/2011 | Fujinawa et al. | |
| 8,147,066 B2 * | 4/2012 | Nozaki et al. | 353/30 |
| 2002/0176015 A1 * | 11/2002 | Lichtfuss | 348/333.1 |
| 2004/0027657 A1 | 2/2004 | Steiner | |
| 2004/0090601 A1 | 5/2004 | Nakanishi et al. | |
| 2007/0091200 A1 * | 4/2007 | Yamaguchi et al. | 348/345 |
| 2007/0258711 A1 * | 11/2007 | Mihara et al. | 396/439 |
| 2008/0002154 A1 | 1/2008 | Ooishi | |
| 2008/0297729 A1 | 12/2008 | Fujinawa et al. | |
| 2009/0116039 A1 * | 5/2009 | Hidaka | 356/622 |
| 2009/0135258 A1 * | 5/2009 | Nozaki | 348/207.99 |
| 2010/0316370 A1 | 12/2010 | Goto et al. | |

FOREIGN PATENT DOCUMENTS

| | | | |
|---|---|---|---|
| DE | 102005062240 A1 | 7/2007 | |
| EP | 1793271 A1 | 6/2007 | |
| JP | 02013071 A | 1/1990 | |
| JP | 2-61627 A | 3/1990 | |

(Continued)

OTHER PUBLICATIONS

European Search Report, EP 10250684, mailed Jun. 28, 2010.

*Primary Examiner* — Rochelle-Ann J Blackman
*Assistant Examiner* — Linda B Smith
(74) *Attorney, Agent, or Firm* — Rabin & Berdo, P.C.

(57) ABSTRACT

This invention provides compact photographic and projection modules and electronic systems having the photographic and projection modules, which not only can project image data but also can capture image with good image quality high zoom ratio. Additionally, the photographic and projection modules are reliable and able to be made with low cost.

19 Claims, 9 Drawing Sheets

(56) References Cited

FOREIGN PATENT DOCUMENTS

| | | |
|---|---|---|
| JP | 4-69640 A | 3/1992 |
| JP | 2005102020 A | 4/2005 |
| JP | 2006067469 A | 3/2006 |
| JP | 2006091091 A | 4/2006 |
| JP | 2006180201 A | 7/2006 |
| JP | 2008042781 A | 2/2008 |
| TW | 200305053 A | 10/2003 |
| TW | 200608124 A | 3/2006 |

* cited by examiner

PHOTOGRAPHIC AND PROJECTION MODULE AND ELECTRONIC SYSTEM HAVING THE SAME

CROSS-REFERENCE TO RELATED APPLICATIONS

This application is a continuation-in-part of co-pending U.S. application Ser. No. 12/723,053 filed Mar. 12, 2010 and entitled "Photographic and Projection Device" which claims priority to Taiwan Patent Application No. 099101283 filed Jan. 18, 2010, and is also a continuation-in-part of U.S. application Ser. No. 13/347,470 filed Jan. 10, 2012 and entitled. "ZOOM LENS" which claims priority to Taiwan Patent Application No. 100113555 filed Apr. 19, 2011, the entire contents all of which are incorporated herein by reference.

BACKGROUND OF THE INVENTION

1. Field of the Invention

The present invention generally relates to a photographic and projection module and an electronic system having the photographic and projection module.

2. Description of Related Art

Portable electronic products, such as multi-media mobile phones, mobile TV, digital cameras, digital video cameras, electronic game players, and mobile multi-media players, have become more and more popular with the common consumer in pervasive and even profound ways. The consumer has grown accustomed to watching multi-media data on portable electronic products. However, screen sizes of these portable electronic products tend to be so small as to make watching multi-media data for a long period of time difficult. To the extent a consumer may choose to view the multi-media data on a larger screen such as that of a conventional projector, this device, too, has many deficiencies. The volume of the conventional projector, for example, is too large to allow the device to be portable. Additionally, the light source of a conventional projector generates a large amount of heat. Moreover, the cooling fan of a conventional projector, in fulfilling its function to dissipate the heating problem, generates unacceptably high levels of noise.

For the reason that there are some disadvantages of the prior art as mentioned, a need exists to propose a photographic and projection module so as to meet consumer needs.

SUMMARY OF THE INVENTION

Accordingly, the present invention has been made in order to meet such a need described above, it being an object of the present invention to provide a photographic and projection module and electronic system so as to meet consumer needs.

An embodiment of this invention provides a photographic and projection module, which comprises a zoom lens, an image sensor, a projection unit, and a first reflective member. The image sensor is used to catch images. The projection unit is used to project light beams. The first reflective member is disposed between the zoom lens and the image sensor or the projection unit. While the first reflective member is at a first position, an external image passes through the zoom lens then being caught by the image sensor. While the first reflective member is at a second position, the light beams are emitted by the projection unit, then refracted by the first reflective member, passing through the zoom lens, and then projected out of the photographic and projection module.

Another embodiment of this invention provides an electronic system comprising a housing, a cover lens, and a photographic and projection module. The housing has an opening, and the cover lens covers the opening of the housing. The photographic and projection module comprises a fixed reflective member arranged at an optical axis and inside the housing; a zoom lens arranged following the fixed reflective member on the optical axis; a movable reflective member disposed following the zoom lens to change positions between a first position and a second position; an image sensor arranged at a first side of the movable reflective member; and a panel arranged at a second side of the movable reflective member; wherein when the movable reflective member is at the first position, first image beams pass through the cover lens, then being reflected by the fixed reflective member, zoomed by the zoom lens, and then focused on the image sensor, and when the movable reflective member is at the second position, the panel emitting the second image beams, which are then reflected by the movable reflective member, zoomed by the zoom lens, reflected by the fixed reflective member, and passed out of the cover lens and the opening.

Another embodiment of this invention provides an electronic system having a housing and a photographic and projection module, the photographic and projection module having a zoom lens, an image sensor and a projection unit, and the photographic and projection module comprising: a fixed reflective member; and a movable reflective member used to switch an optical path; wherein while the movable reflective member is located at a photographic position, an external image is caught by the image sensor; and wherein while the movable reflective member is located at a projection position, an internal image are projected out of the photographic and projection module.

BRIEF DESCRIPTION OF THE DRAWINGS

FIG. 3A and FIG. 3B are two perspective views of an electronic system having a photographic and projection module in accordance with another embodiment of the present invention, in which FIG. 3A is image-capturing mode and FIG. 3B is image-projecting mode.

FIG. 5C shows the zoom lens in an image-projecting operation.

DETAILED DESCRIPTION OF THE INVENTION

A detailed description of the present invention will be discussed in connection with the following embodiments, which are not intended to limit the scope of the present invention and which can be adapted for other applications. While the drawings are illustrated in detail, it is to be appreciated that the quantity of the disclosed components may be greater or less than that disclosed except for instances expressly restricting the amount of the components.

Figure 1:
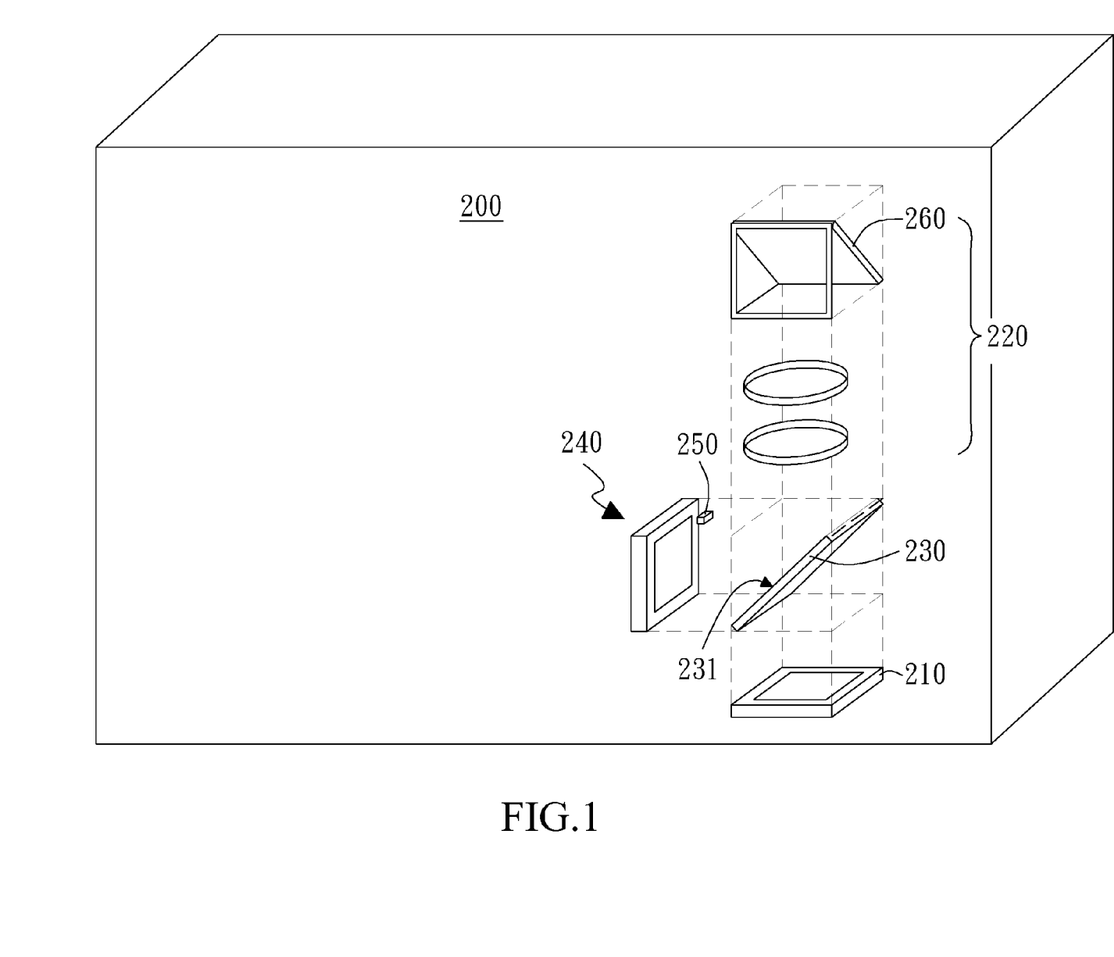
FIG. 1 is a perspective view of a photographic and projection module in accordance with an embodiment of the present invention.

FIG. 1 provides a perspective view of a photographic and projection module 200 in accordance with an embodiment of the present invention. The photographic and projection module 200 includes an image sensor 210, a zoom lens 220, a movable reflective member 230, and a projection unit 240.

The zoom lens 220 is disposed over the image sensor 210, and the zoom lens 220 may comprise a fixed reflective member 260 and at least one lens group and each group comprises at least one lens. The zoom lens 220 is used for optical operations, such as focusing, zoom-in, zoom-out, and so on. The movable reflective member 230 has a reflective surface 231, and may be disposed between the zoom lens 220 and the image sensor 210 or removed away from an optical axis of the photographic and projection module 200. The projection unit 240 is located towards the reflective surface 231 of the movable reflective member 230.

In one embodiment, the projection unit 240 mainly comprises a display panel and at least one light source 250. The reflective surface 231 of the movable reflective member 230 is capable of changing the path of light beams from the projection unit 240, and the movable reflective member 230 is capable of changing position among a plurality of positions, such as a first position and a second position. For instance, when the movable reflective member 230 is located at the first position, a plurality of external light beams may pass through the zoom lens 220 and an external image can be formed on the image sensor 210; when the movable reflective member 230 is located at the second position, the light beams provided by the projection unit 240 may be projected to the outside via the movable reflective member 230 and the zoom lens 220.

Figure 2A:
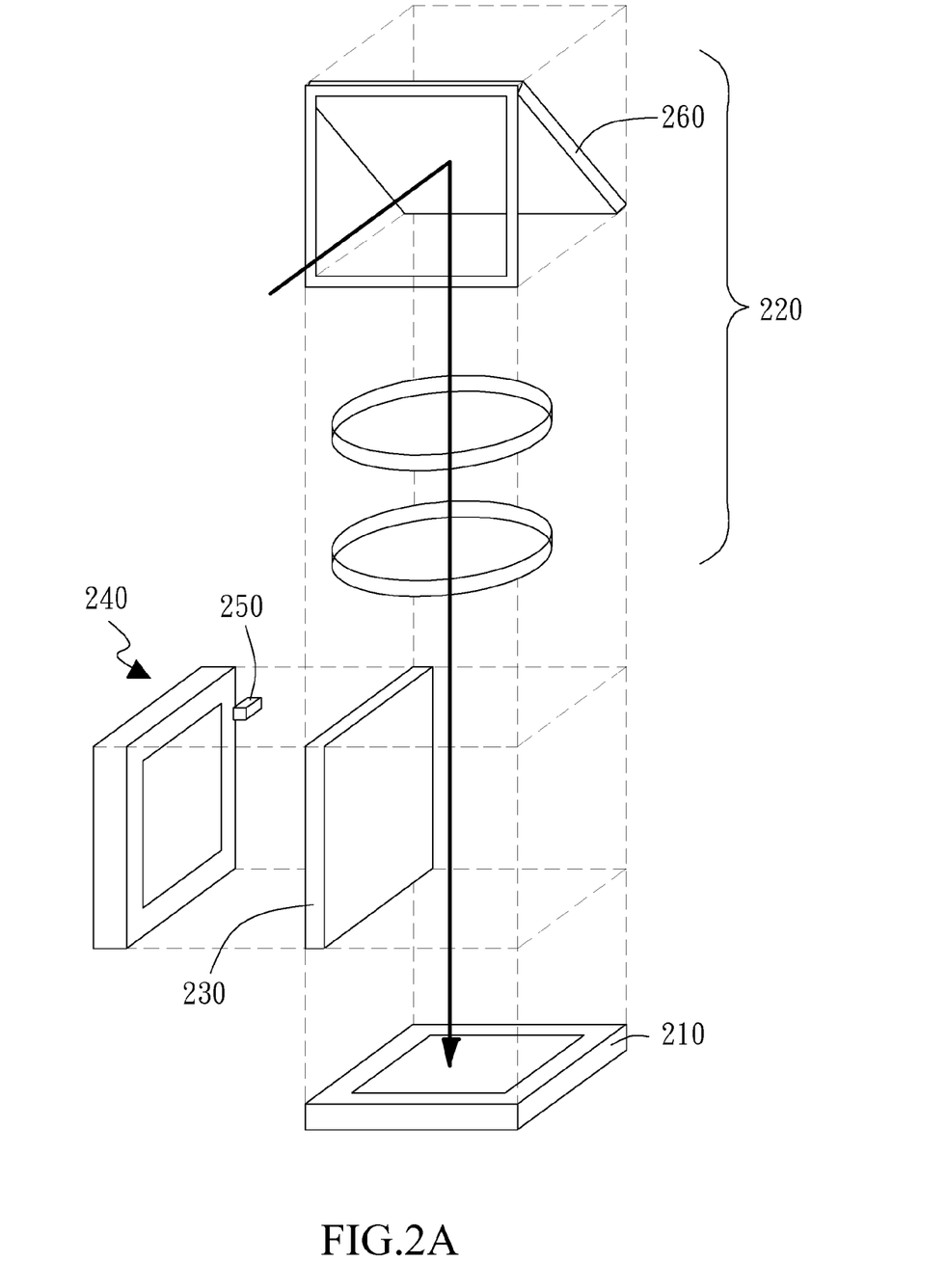
FIG. 2A and FIG. 2B show different operation methods of the photographic and projection module.

FIG. 2A and FIG. 2B show, respectively, two different operation methods of the photographic and projection module 200. Referring to FIG. 2A, one operation method comprises the movable reflective member 230 being located at the first position whereby the movable reflective member 230 will not interfere with the external light beams. Therefore, the external light beams can be passed through the zoom lens 220 and be formed the external image by the image sensor 210.

Figure 2B:
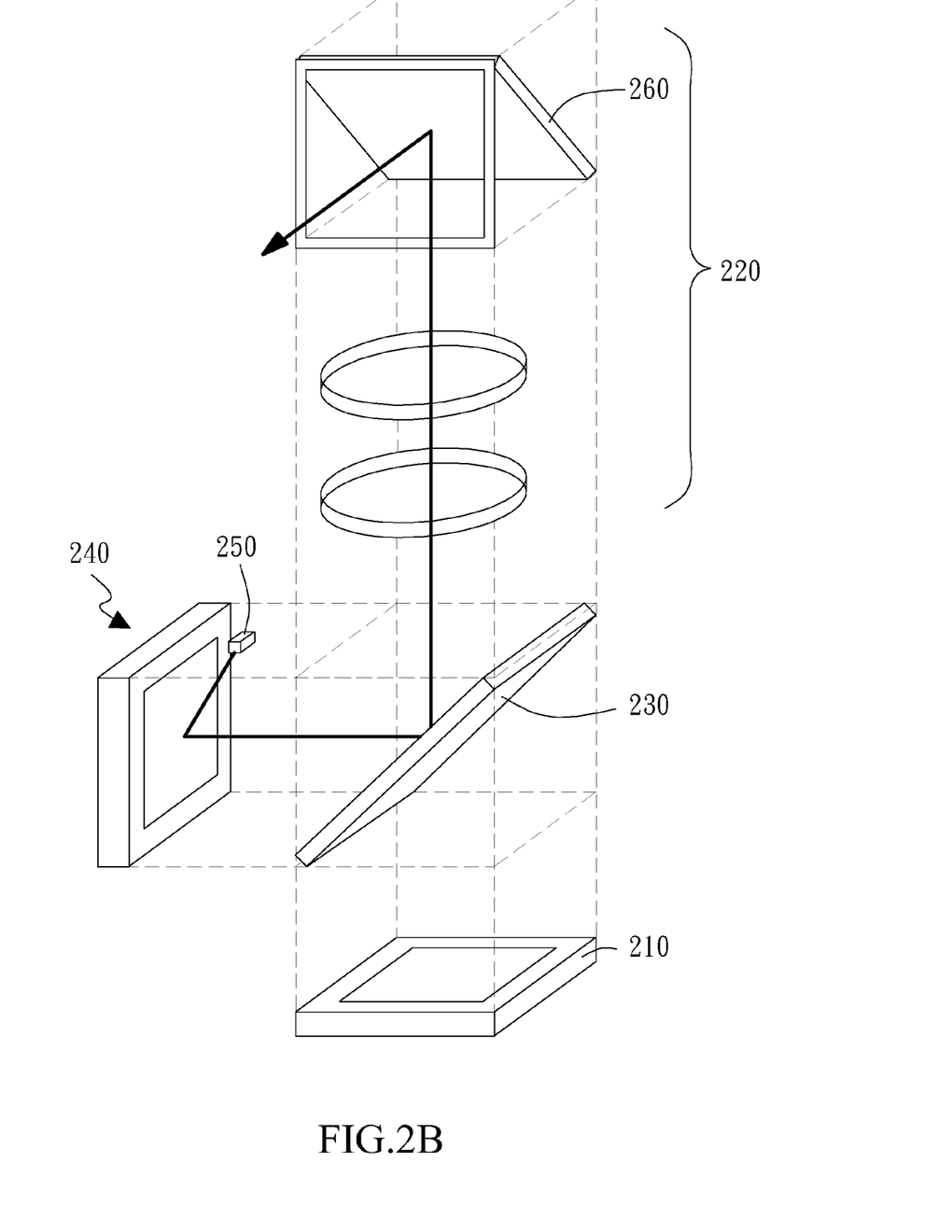

Moreover, with reference to FIG. 2B, another operation method comprises the movable reflective member 230 being located at the second position whereby the external light beams cannot be caught by the image sensor 210, and the light beams from the projection unit 240 can be projected to the outside of the photographic and projection module 200 via the movable reflective member 230 and the zoom lens 220.

In this embodiment, the movable reflective member 230 may be a movable reflective mirror or a movable prism, and the movable prism may be a reflective coating prism with a reflective surface or a total reflection prism with a total reflective surface. The movable reflective mirror and the reflective coating prism respectively comprise a reflective surface which is coated with an optical reflective film, such as dielectric film or metal film. Otherwise, the total reflective surface of the total reflection prism does not have any optical coating whose position is changed between the first position and the second position by rotation or linear movement, with the arrangement being provided by way of illustration rather than restriction such that the present invention should not be limited to this. Moreover, in this embodiment, the image sensor 210 may be a charge-coupled device (CCD) or a Complementary Metal-Oxide Silicon (CMOS) image sensor, but again the invention should not be limited to this.

In the current embodiment, the projection unit 240 may comprise a Liquid Crystal Display (LCD) panel which is preferably a reflection-type LCD panel. The projection unit 240 may further comprise at least one light source 250, wherein the light source 250 may preferably be a Light Emitting Diode (LED) light source for emitting light beams. Although specific details of the projection unit 240 have been illustrated and described in the embodiment mentioned above, the design of the projection unit 240 is not to be so limited. Based on different needs, the projection unit 240 can comprise other kinds of image display devices or other designs.

According to this embodiment, the fixed reflective member 260 of the zoom lens 220 may be a fixed reflective mirror or a fixed prism, and the fixed prism may be a reflective coating prism with a reflective surface or a total reflection prism with a total reflective surface. The fixed reflective mirror and the reflective coating prism respectively comprise a reflective surface which is coated with an optical reflective film, such as dielectric film or metal film. Otherwise, the total reflective surface of the total reflection prism has no optical coating. The optical operations, such as focusing, zoom-in, and zoom-out, can be performed within the photographic and projection module 200 so as to prevent affecting the industry design of the photographic and projection module 200. Hence, the photographic and projection module 200 can be compacted in an electronic system, such as a digital camera, a cell phone, a global positioning system (GPS), and a personal digital assistant (PDA), but is not limited to this. Based on different needs, the photographic and projection module 200 can comprise other industry designs or other structural designs.

Figure 3A:
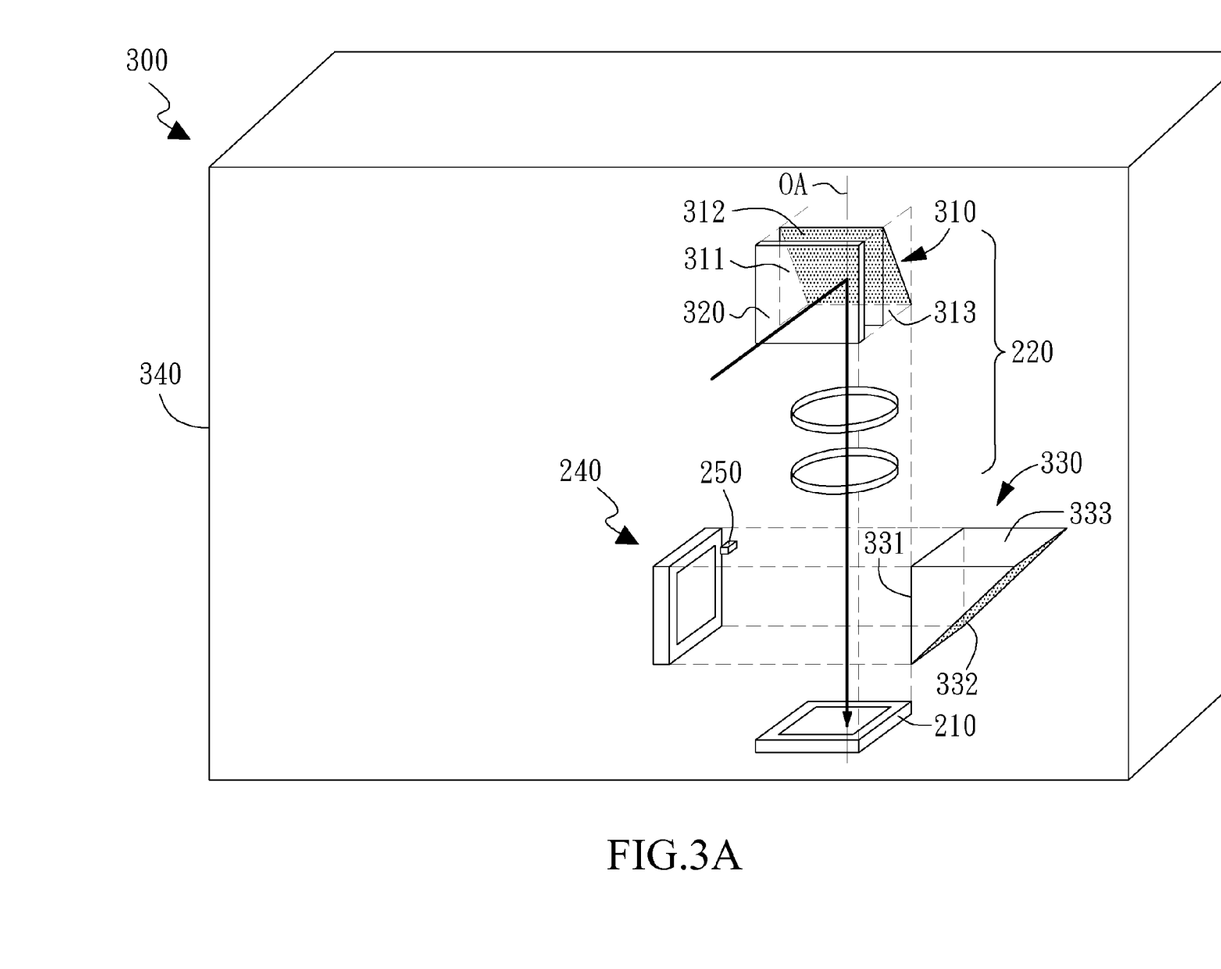
Figure 3B:
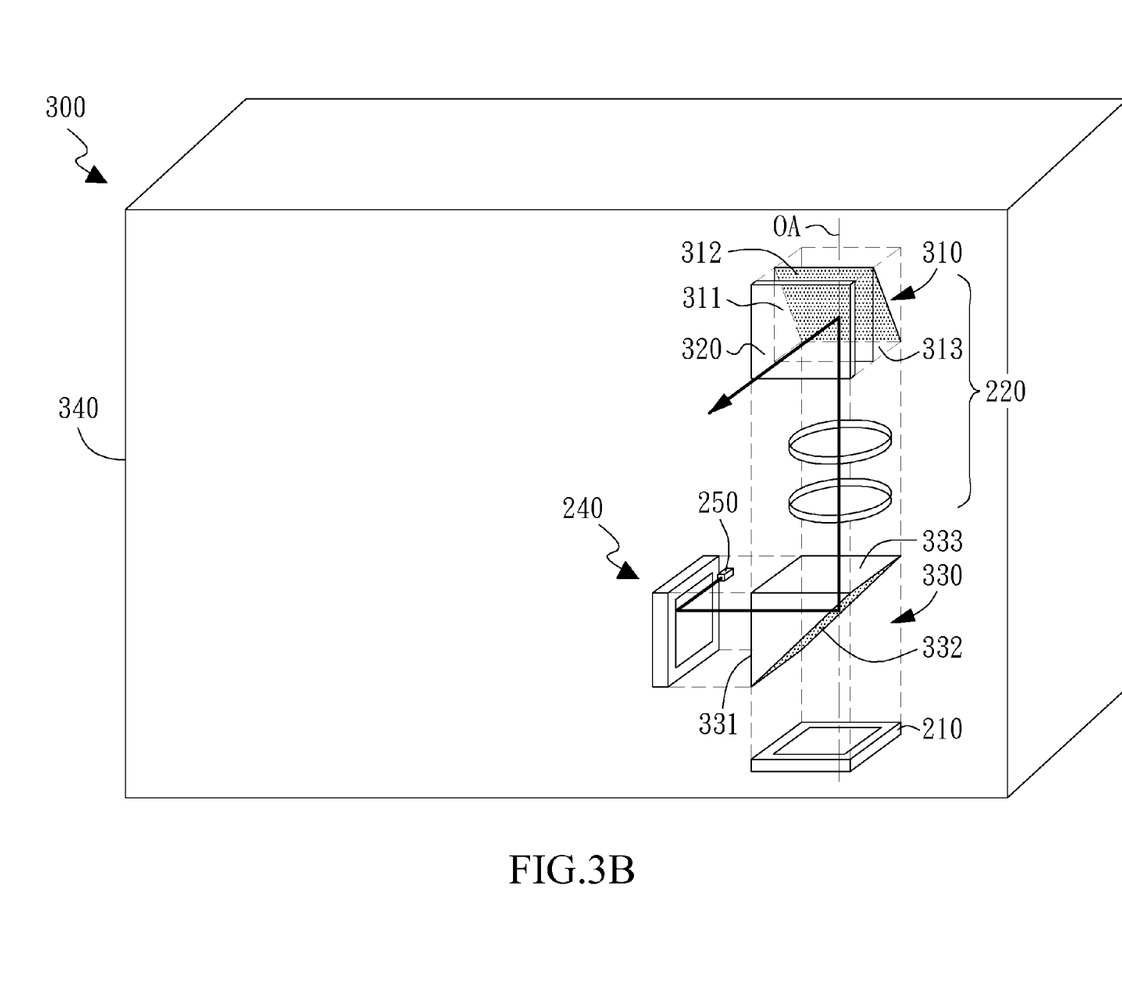

FIG. 3A and FIG. 3B show an electronic system 300 having a photographic and projection module according to another embodiment of this invention, in which FIG. 3A shows the electronic system 300 for capturing the external image, and FIG. 3B shows the electronic system 300 for projecting the light beams provided by the projection unit 240. For simplicity, components with same or similar reference numbers refer to same or similar components of the foregoing embodiments, and the detailed description, modifications, equivalents, and alternatives of which will be omitted.

Referring to FIG. 3A and FIG. 3B, in this embodiment, a fixed prism 310 is used as the fixed reflective member 260, and a movable prism 330 is used as the movable reflective member 230 of the photographic and projection module 200. The electronic system 300 comprises a housing 340 with an opening (not shown) and a photographic and projection module, which can be practiced within the housing 340. The photographic and projection module preferably comprises a cover lens 320, a zoom lens 220, the movable prism 330, an image sensor 210 and a projection unit 240. The fixed prism 310 is arranged at an optical axis OA of the photographic and projection module. The zoom lens 220 comprises the fixed prism 310 which is on the optical axis OA. The movable prism 330 is disposed following the zoom lens 220 to change positions between a first position and a second position. The image sensor 210 is arranged at a first side of the movable prism 330, and the projection unit 240 is arranged at a second side of the movable prism 330. The cover lens 320 and other components of the photographic and projection module as well as their activities, including the zooming and focusing of the zoom lens 220.

The fixed prism 310 may be a reflective coating prism with a reflective surface or a total reflection prism with a total reflective surface for the light beams from the projection unit 240. Specifically, the fixed prism 310 includes a first surface 311, a second surface 312, and a third surface 313. Typically, at least one of the first surface 311 and the third surface 313 is coated with an anti-reflective film. Additionally, the second surface 312 of the reflective coating prism is coated with an optical reflective film, such as dielectric film or metal film. Otherwise, the second surface 312 of the total reflection prism does not have any optical reflective film.

The movable prism 330 may be a reflective coating prism with a reflective surface or a total reflection prism with a total reflective surface for the light beams. The movable prism 330 includes a first surface 331, a second surface 332, and a third surface 333. Typically, at least one of the first surface 331 and the third surface 333 are coated with an anti-reflective film, and the second surface 332 is coated with an optical reflective film, such as dielectric film or metal film; the second surface 332 of the total reflection prism with no optical reflective film. Similar to the embodiment of FIGS. 2A and 2B, the movable prism 330 is able to change its position between a first position and a second position, as respectively shown in FIG. 3A and FIG. 3B, by rotation or movement, and preferably by rotation. Modifications may be made to the above embodiment.

Referring to FIG. 3A, when the movable prism 330 is at the first position, the external image passes through the cover lens 320 and the zoom lens 220, and then focuses the image on the image sensor 210. Wherein the external image enters the fixed prism 310 via the first surface 311, reflected via the second surface 312, and transmitted out of the fixed prism 310 from the third surface 313.

Referring to FIG. 3B, when the movable prism 330 is at the second position, the light source 250 emits light beams to render the display panel of the projection unit 240 reflecting the light beams in accordance with an internal image. The light beams of the internal image is projected into the movable prism 330 via the first surface 331, reflected via the second surface 332, and transmitted out of the movable prism 330 via the third surface 333. The zoom lens 220 then focuses the light beams of the image, and the fixed prism 310 reflects the light beams via a reverse order mentioned before. The light beams are finally projected out of the electronic system 300 through the cover lens 320 and the opening.

Figure 4:
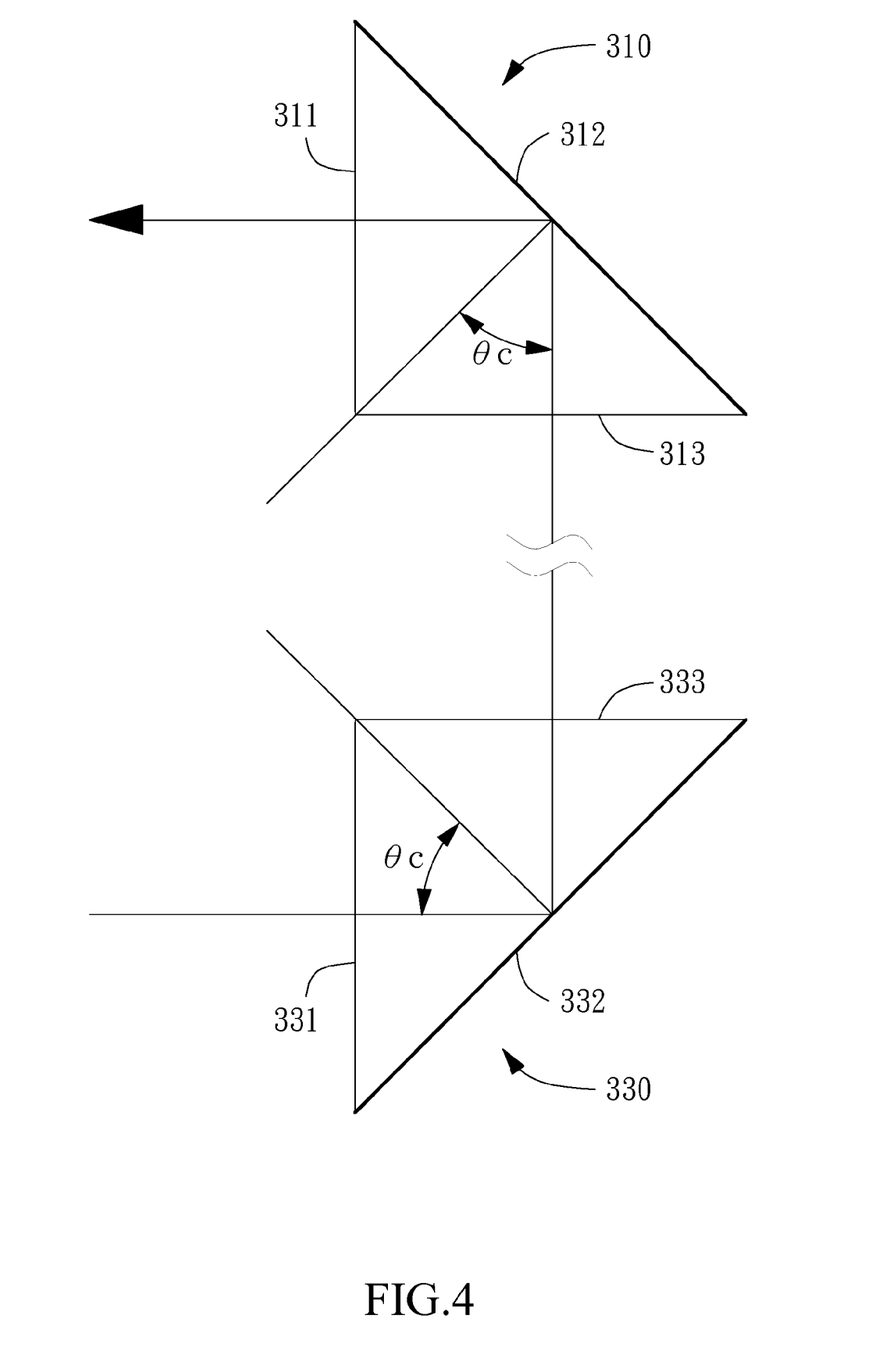
FIG. 4 shows the theory of the prisms used in this invention.

FIG. 4 illustrates a diagram of the movable prism 330 and the fixed prism 310 while the module 200 is projecting an image, according to another embodiment of this invention. Notice that this diagram is used to illustrate theory; the orientation of the prism 310/330 may be different from the real situation. Referring to FIG. 4, a first surface 331 and a third surface 333 of the movable prism 330 may be coated with an optical anti-reflection film; however, the second surface 332 is a bare surface. The fixed prism 310 and the movable prism 330 reflect the image beam by total internal reflection and to meet the total internal reflection, the prism 310/330 satisfies the following equation:

$n \sin \theta c \geq 1$, wherein n is the refractive index of the movable prism 330 or the fixed prism 310, $\theta c$ is a critical angle between the incident image beam and the normal vector of reflected surface, i.e., the second surface 332 or the second surface 312. In current embodiment, the refractive index of the prisms 330/310 may range from 1.50 to 1.90, e.g., 1.53, and thus the critical angle $\theta c = \sin^{-1}(1/n) = \sin^{-1}(1/1.53)$. Because the image beams from the display panel 240 is collimated, total internal reflection is easily achieved. Although the prisms 310/330 have triangular configuration in this example, in other embodiments, the movable prism 330 and/or the fixed prism 310 may have other configurations (e.g., elbow tube-shaped) and may have more than one bare reflective surface at its boundary and each surface reflects the image beam by total internal reflection. Namely, the prisms 310/330 may be total internal reflection (TIR) lens with triangular shape or other configurations. In addition, the mentioned fixed reflective member 260 may replace the fixed prism 310 in other embodiments.

Figure 5A:
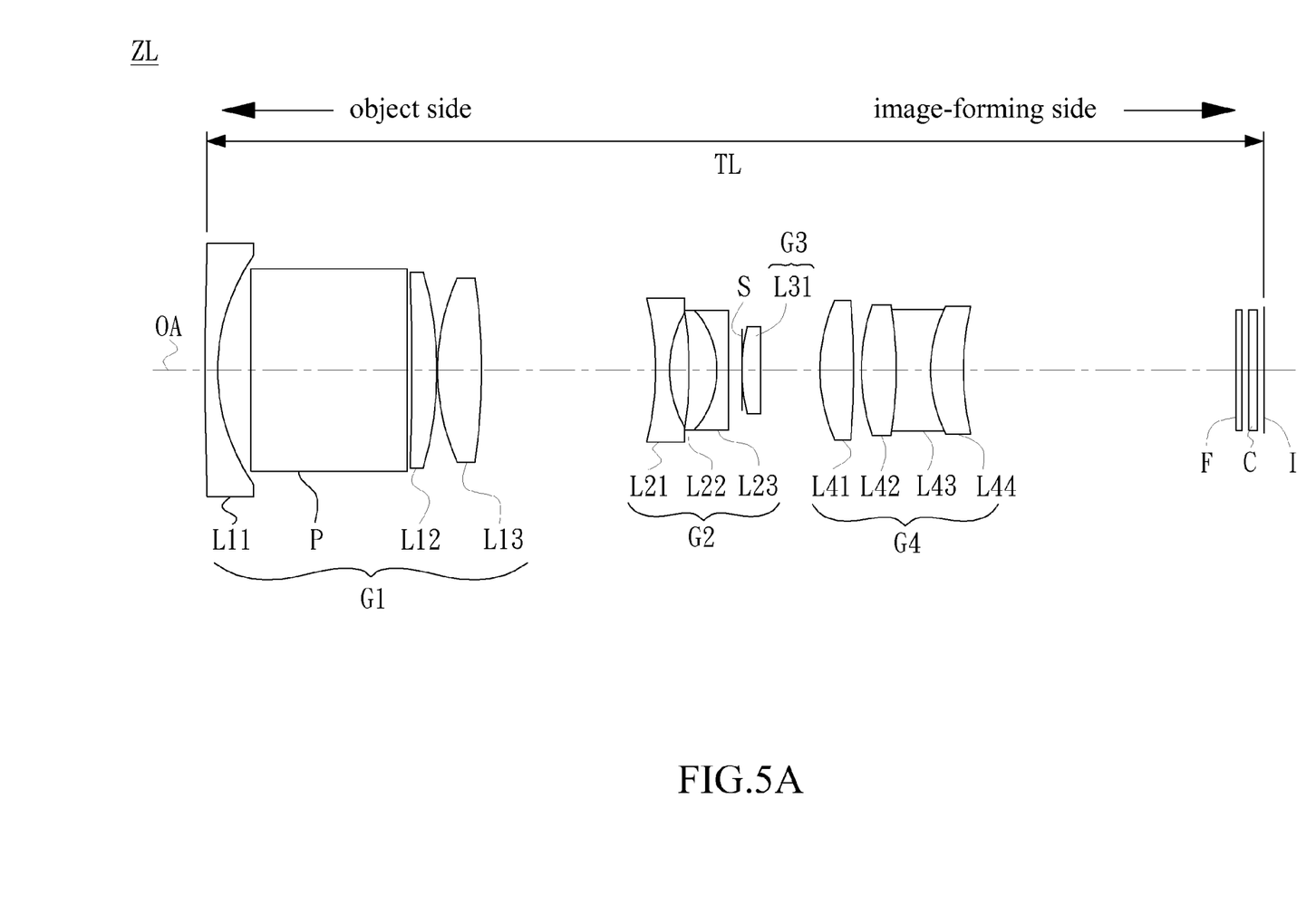
FIG. 5A to FIG. 5C show a zoom lens ZL used in the photographic and projection modules and the electronic systems of this invention, wherein FIG. 5A and FIG. 5B respectively show the zoom lens in the telephoto end and the wide-angle end of the image-capturing operation.
Figure 5B:
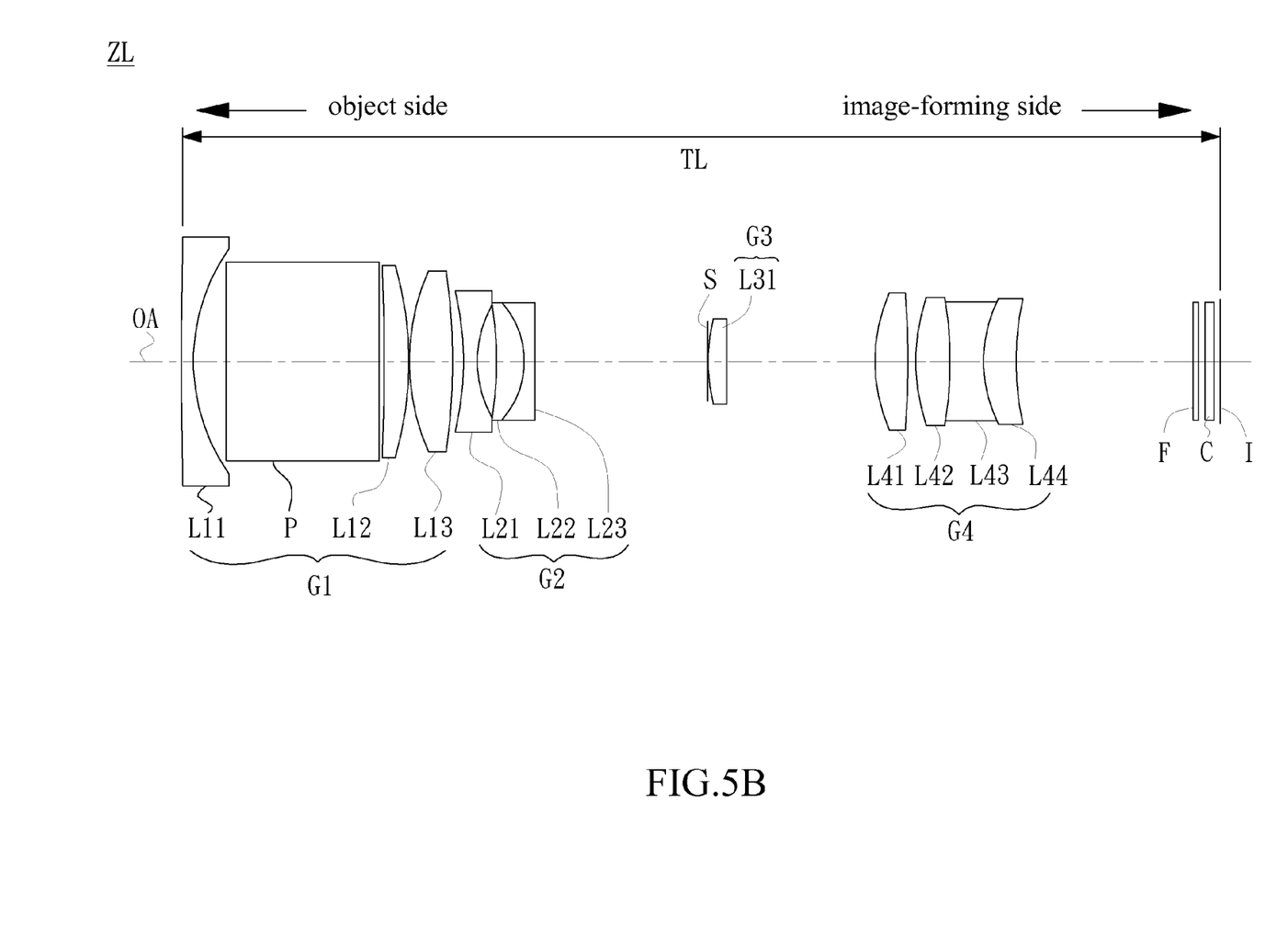
Figure 5C:
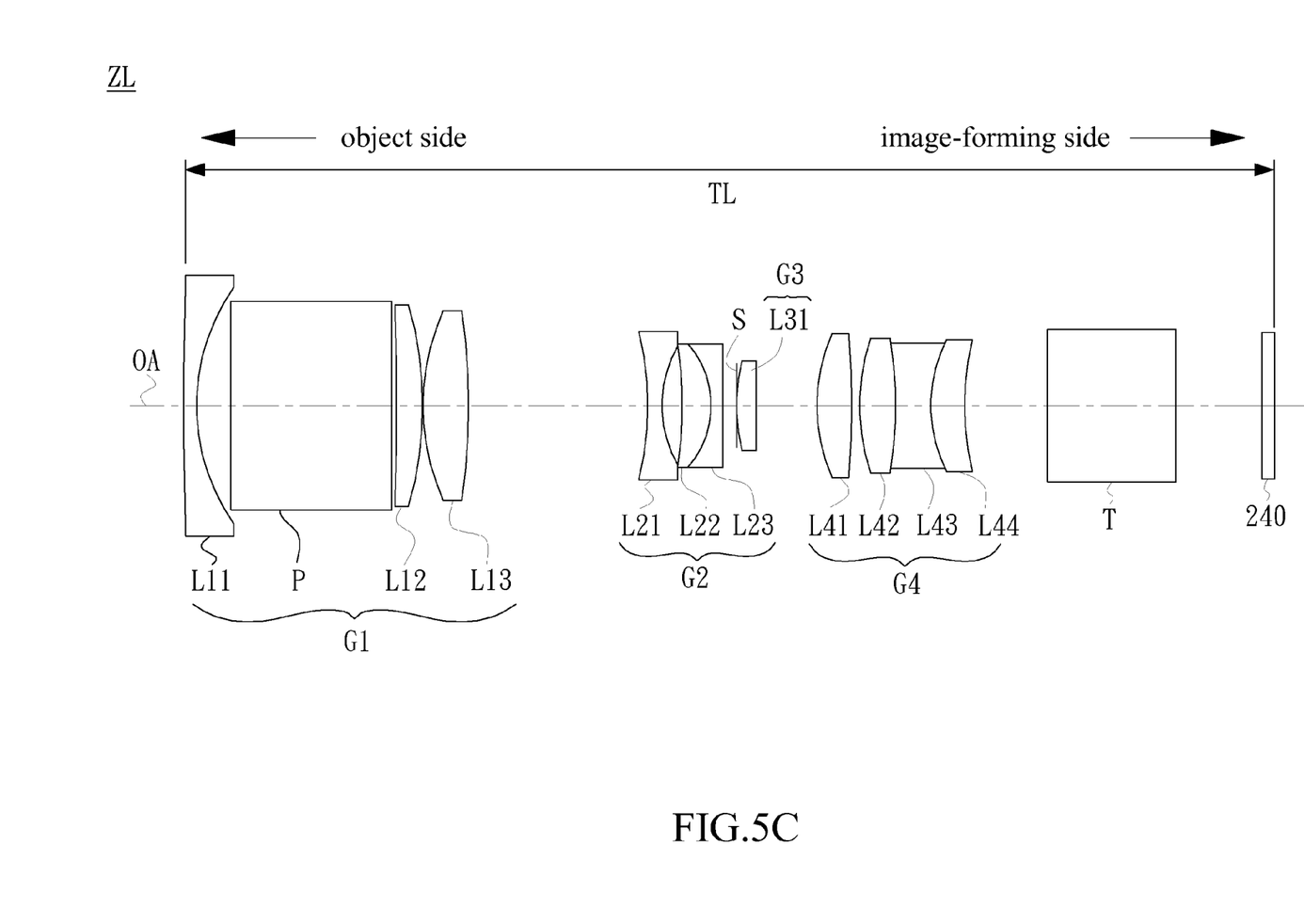

Additionally, a challenge is to provide good image quality with rigorous size requirement. According to a preferred embodiment of this invention, FIG. 5A to FIG. 5C show a zoom lens ZL used in the mentioned photographic and projection modules 200 or electronic system 300, wherein FIG. 5A and FIG. 5B respectively show the zoom lens in the telephoto end and the wide-angle end of the image-capturing operation, and FIG. 5C shows the zoom lens in an image-projecting operation. For identification, image-forming surface I corresponds to the image sensor 210, and lens group G1, G2, G3, and G4 correspond to zoom lens 220 in which first lens L11 corresponds to the cover lens 320, prism P corresponds to the fixed prism 310, and lens T corresponds to the movable prism 330.

As shown in FIG. 5A and FIG. 5B, the zoom lens ZL primarily consists of, in order from an object side to an image-forming side, a first lens group G1, a second lens group G2, a third lens group G3, and a fourth lens group G4 arranged along the optical axis OA, and an image-forming surface I is arranged at the image-forming side. The first lens group G1 has positive refractive power, the second lens group G2 has negative refractive power, the third lens group G3 has positive refractive power, and the fourth lens group G4 has positive refractive power.

For needs of compact size, low cost, high zoom ratio, and good image quality, the zoom lens ZL satisfies the following conditions:

$$4.0 < ft/fw < 6.0; \text{ and} \quad (1)$$

$$2.0 < |fG1/fG2| < 4.0, \quad (2)$$

wherein fG1 denotes the focal length of the first lens group G1, fG2 denotes the focal length of the second lens group G2, fw denotes the focal length of the zoom lens ZL at the wide-angle end, and ft denotes the focal length of the zoom lens ZL at the telephoto end.

As shown in FIG. 5A and FIG. 5B, the zoom lens ZL may further comprise a stop S and a filter F. The (aperture) stop S may be arranged between the second lens group G2 and the third lens group G3, for limiting the light flux of the image beam into the third lens group G3. The filter F may be arranged between the fourth lens group G4 and the image-forming surface I, for filtering invisible light off the image beam. The filter F may be an infrared light filter. In addition, a flat lens C, as a cover glass, may be arranged between the image-forming surface I and the filter F.

In this embodiment, when the zoom ratio and the focal length of the zoom lens ZL are needed to be adjusted, the positions of the first lens group G1 and the third lens group G3 will be kept, and the second lens group G2 and the fourth lens group G4 are moved along the optical axis OA, so as to determine a zoom ratio. In detail, when zooming from the telephoto end to the wide-angle end, the second lens group G2 and the fourth lens group G4 are moved away from the third lens group G3.

Referring to FIGS. 5A to 5C again, the zoom lens ZL comprises at least four aspheric lenses or free-form lenses. In detail, each of the four lens groups comprises an aspheric lens or a free-form lens made of plastic or glass. The plastic may comprise, but is not limited to, polycarbonate, cyclic olefin copolymer (e.g., APEL), polyester resins (e.g., OKP4 or OKP4HT), and the like. In addition, each free-form lens comprises at least one free-form freedom surface, and each aspheric lens comprises at least one aspheric surface satisfying the following equation (3):

$$Z = \frac{CY^2}{1+\sqrt{1-(K+1)C^2Y^2}} + A_4Y^4 + A_6Y^6 + A_8Y^8 + A_{10}Y^{10} + A_{12}Y^{12},$$

where Z is the coordinate in the optical axis OA direction in which direction light propagates is positive, $A_4$, $A_6$, $A_8$, $A_{10}$, and $A_{12}$ are aspheric coefficients, K is coefficient of quadratic surface, R is the radius of curvature, C is reciprocal of R(C=1/R), Y is the coordinate in a direction perpendicular to the optical axis in which the upward direction is positive, and coefficients of equation (3) of each aspheric lens are predetermined to determine the focal length and thus satisfy the above-mentioned conditions.

In this preferred embodiment, the first lens group G1 comprises, in order from the object side to the image-forming side, a first lens L11, a second lens L12, a third lens L13, in which the first lens L11 is a negative convex-concave lens having a convex toward the object side, the second lens L12 is a positive convex-concave lens having a convex toward the image-forming side, and the third lens L13 is a positive biconvex lens. The second lens group G2 comprises, in order from the object side to the image-forming side, a first lens L21, a second lens L22, a third lens L23, in which the first lens L21 is a negative biconcave lens, the second lens L22 is a negative convex-concave lens having a convex toward the image-forming side, and the third lens L23 is a positive convex-concave lens having a convex toward the image-forming side. The third lens group G3 comprises a first lens L31, which is a positive biconvex lens. The fourth lens group G4 comprises, in order from the object side to the image-forming side, a first lens L41, a second lens L42, a third lens L43, and a fourth lens L44, in which the first lens L41 is a positive biconvex lens, the second lens L42 is a positive biconvex lens, the third lens L43 is a negative biconcave lens, and the fourth lens L44 is a negative convex-concave lens having a convex surface toward the object side.

In addition, the zoom lens ZL may further comprise a reflector for deflecting the direction of the image beam. For example, the zoom lens ZL may deflect the direction of the image beam by 90°. In this preferred embodiment, the reflector is a prism P, arranged between the first lens L11 and the second lens L12 of the first lens group G1, for deflecting the optical path of the image beam and shortening the total length of the zoom lens ZL.

Furthermore, in this preferred embodiment, the zoom lens ZL further satisfies the following condition:

$$1.5 < PL/fw < 2.2, \quad (4)$$

wherein PL denotes the optical path length of the prism P for deflecting the image beam, i.e., the optical path of the image beam within the prism P. In another embodiment, condition (4) may be modified as 1.75<PL/fw<2.0.

Notice that other embodiments of this invention may omit the reflector. In practical, the third lens L13 of the first lens group G1, the first lens L21 of the second group G2, the first lens L31 of the third lens group G3, and the fourth lens L44 of the fourth lens group G4 are aspheric lenses with two aspheric surfaces or free-form lenses with two free-form freedom surfaces, and other lenses of the zoom lens are spherical glass lenses with two spherical surfaces. In this preferred embodiment, the third lens L13 and the first lens L31 are glass lenses, and the first lens L21 and the fourth lens L44 are plastic lenses. In addition, the second lens L22 and the third lens L23 of the second lens group G2, and the second lens L42 and the third lens L43 of the fourth lens group G4, may be glued to be a doublet lens.

A preferred embodiment of the zoom lens and its aberration can be found in Table 1, Table 2, Table 3, and Table 4 and related drawings in the foregoing U.S. application Ser. No. 13/347,470 filed Jan. 10, 2012 and entitled "ZOOM LENS." The zoom lens indeed reveals good image quality and also has advantages of compact size, high zoom ratio, and low cost. Although the zoom lens comprises four lens groups, other numbers of lens groups, e.g., one to three or five to six lens groups or more, may also be designed and adapted.

Although specific embodiments have been illustrated and described, it will be appreciated by those skilled in the art that various modifications may be made without departing from the scope of the present invention, which is intended to be limited solely by the appended claims.

What is claimed is:

1. A photographic and projection module, comprising:
a zoom lens;
an image sensor used to catch an external image;
a projection unit used to project light beams; and
a first reflective member disposed between the zoom lens and the image sensor or the projection unit;
wherein the zoom lens comprises a second reflective member;
wherein while the first reflective member is at a first position, the external image passes through the zoom lens then being caught by the image sensor; and
wherein while the first reflective member is at a second position, the light beams are emitted by the projection unit, then reflected by the first reflective member, passing through the zoom lens, and then projected out of the photographic and projection module.

2. The photographic and projection module as recited in claim 1, wherein the first reflective member comprises a minor or a prism.

3. The photographic and projection module as recited in claim 1, wherein the first reflective member has a refractive index ranging from 1.50 to 1.90.

4. The photographic and projection module as recited in claim 1, wherein the projection unit comprises a panel.

5. The photographic and projection module as recited in claim 1, wherein the second reflective member comprises a mirror or a prism.

6. The photographic and projection module as recited in claim 1, wherein the zoom lens further comprising at least one lens group.

7. The photographic and projection module as recited in claim 2, wherein the prism is a reflective coating prism or a total reflection prism.

8. The photographic and projection module as recited in claim 4, wherein the projection unit further comprising a light source arranged between the panel and the first reflective member.

9. The photographic and projection module as recited in claim 5, wherein the prism is a reflective coating prism or a total reflection prism.

10. An electronic system, comprising:
a housing having an opening;
a cover lens covering the opening of the housing; and
a photographic and projection module comprising:
a zoom lens comprising a fixed reflective member arranged on an optical axis and inside the housing;
a movable reflective member disposed following the zoom lens to change positions between a first position and a second position;
an image sensor arranged at a first side of the movable reflective member; and a projection unit arranged at a second side of the movable reflective member;

wherein when the movable reflective member is at the first position, first image beams pass through the cover lens, then being reflected by the fixed reflective member, and then focused on the image sensor, and when the movable reflective member is at the second position, the projection unit emitting the second image beams, which are reflected by the movable reflective member and the fixed reflective member, and then passed through the cover lens and the opening.

11. The electronic system as recited in claim 10, wherein the fixed reflective member and the movable reflective member comprise a minor or a prism respectively.

12. The electronic system as recited in claim 10, wherein the fixed reflective member and the movable reflective member have refractive indexes ranging from 1.50 to 1.90 respectively.

13. The electronic system as recited in claim 10, wherein the projection unit comprises a panel and at least one light source, and the light source is arranged between the panel and the movable reflective member.

14. The electronic system as recited in claim 11, wherein the prism is a reflective coating prism or a total reflection prism.

15. The electronic system as recited in claim 13, wherein the panel is a reflection-type LCD panel, and the light source is an LED.

16. An electronic system having a housing and a photographic and projection module, the photographic and projection module having an image sensor and a projection unit, and the photographic and projection module comprising:

a zoom lens having a fixed reflective member; and a movable reflective member used to switch an optical path;

wherein while the movable reflective member is located at a photographic position, an external image passes through the zoom lens and is caught by the image sensor; and wherein while the movable reflective member is located at a projection position, an internal image are projected out of the photographic and projection module.

17. The electronic system as recited in claim 16, wherein the fixed reflective member and the movable reflective member comprise a minor or a prism respectively.

18. The electronic system as recited in claim 16, wherein the fixed reflective member and the movable reflective member have refractive indexes ranging from 1.50 to 1.90 respectively.

19. The electronic system as recited in claim 17, wherein the prism is a reflective coating prism or a total reflection prism.

* * * * *